(12) United States Patent
Hagen

(10) Patent No.: US 7,354,075 B2
(45) Date of Patent: Apr. 8, 2008

(54) ADAPTER-INTERMEDIATE RING FOR A SCREW-IN PART OF A FLUID PLUG SYSTEM

(75) Inventor: Harald Hagen, Wipperfürth (DE)

(73) Assignee: Voss Automotive GmbH, Wipperfurth (DE)

( * ) Notice: Subject to any disclaimer, the term of this patent is extended or adjusted under 35 U.S.C. 154(b) by 215 days.

(21) Appl. No.: 10/528,207

(22) PCT Filed: Aug. 25, 2003

(86) PCT No.: PCT/EP03/09379

§ 371 (c)(1),
(2), (4) Date: Mar. 17, 2005

(87) PCT Pub. No.: WO2004/029499

PCT Pub. Date: Apr. 8, 2004

(65) Prior Publication Data

US 2005/0258647 A1 Nov. 24, 2005

(30) Foreign Application Priority Data

Sep. 20, 2002 (DE) .................................. 202 14 631

(51) Int. Cl.
*F16L 3/04* (2006.01)
*F16L 17/06* (2006.01)
*F16B 43/00* (2006.01)

(52) U.S. Cl. ..................... 285/143.1; 285/98; 285/108; 285/139.2; 285/379; 285/917; 277/609; 411/542

(58) Field of Classification Search ............. 285/143.1, 285/98, 108, 379, 917, 349, 139.2, 204; 277/609, 277/616, 630, 638; 411/542, 369, 371.1, 411/371.2
See application file for complete search history.

(56) References Cited

U.S. PATENT DOCUMENTS

| 1,672,879 | A |   | 6/1928  | Campbell, Jr.          |
|-----------|---|---|---------|------------------------|
| 2,904,355 | A | * | 9/1959  | Creamer ........ 285/113 |
| 3,212,796 | A | * | 10/1965 | Neuschotz ....... 285/91 |
| 3,519,279 | A | * | 7/1970  | Wagner .......... 411/542 |

(Continued)

FOREIGN PATENT DOCUMENTS

DE    1 094 055    12/1960

(Continued)

*Primary Examiner*—Daniel P. Stodola
*Assistant Examiner*—Jay R Ripley
(74) *Attorney, Agent, or Firm*—Brinks Hofer Gilson & Lione

(57) ABSTRACT

An adapter assembly having an intermediate ring and a screw-in part for a fluid plug-in system. The adapter assembly includes an externally threaded portion for threading into a threaded bore and an actuating shoulder. A receiving groove is formed in the transition between the actuating shoulder and the externally threaded portion with a first sealing ring is disposed therein. The intermediate ring fits onto the externally threaded portion and has opposing axially spaced annular portions. A first annular portion cooperates with the receiving groove and the actuating shoulder to form a first sealing chamber for the first sealing ring. A second sealing seat of a second annular portion facing away from the actuating shoulder cooperates with a surrounding surface adjacent to the bore and the externally threaded portion to form a second sealing chamber for the second sealing ring axially spaced from the first sealing chamber.

14 Claims, 4 Drawing Sheets

U.S. PATENT DOCUMENTS

| | | | | |
|---|---|---|---|---|
| 4,895,215 A | * | 1/1990 | Rives | 175/371 |
| 5,240,290 A | * | 8/1993 | Kim | 285/40 |
| 5,280,390 A | * | 1/1994 | Ito | 359/676 |
| 5,433,489 A | | 7/1995 | Kimura | |
| 6,027,144 A | * | 2/2000 | Hagen et al. | 285/93 |

FOREIGN PATENT DOCUMENTS

| | | |
|---|---|---|
| EP | 0 005 865 | 3/1984 |
| EP | 0 913 618 | 5/1999 |

* cited by examiner

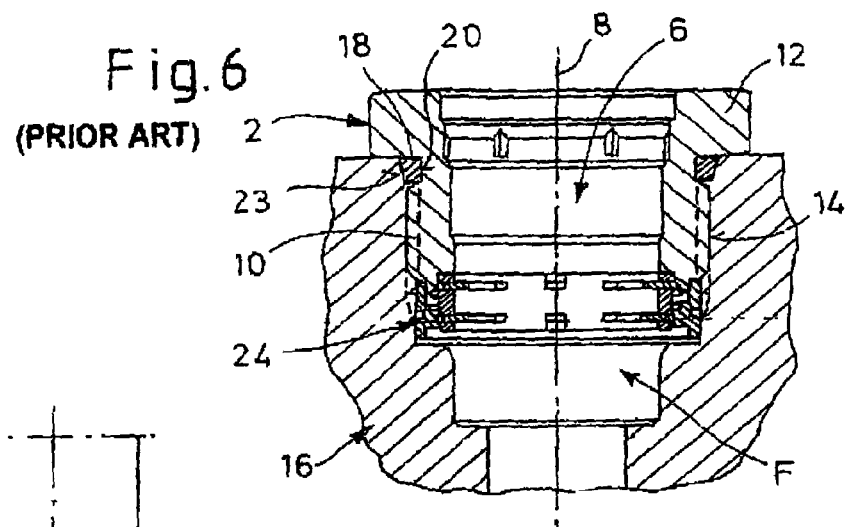
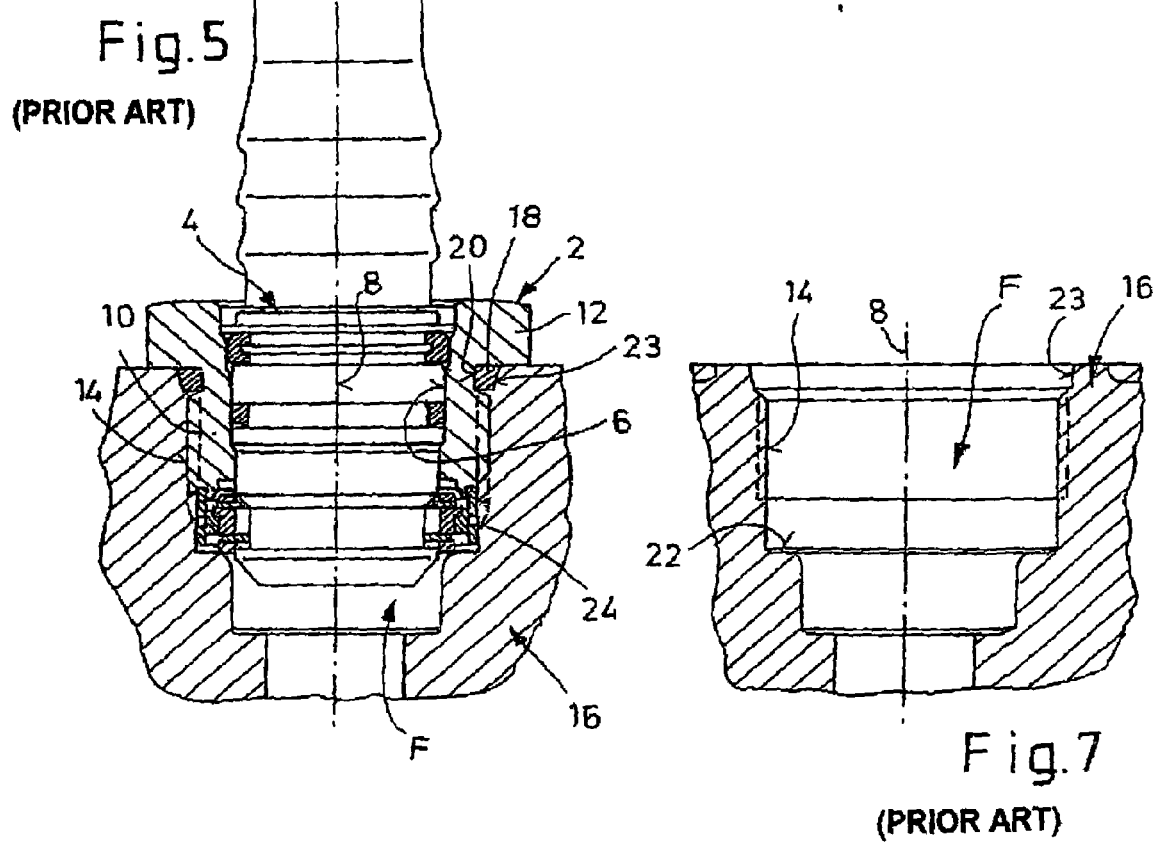
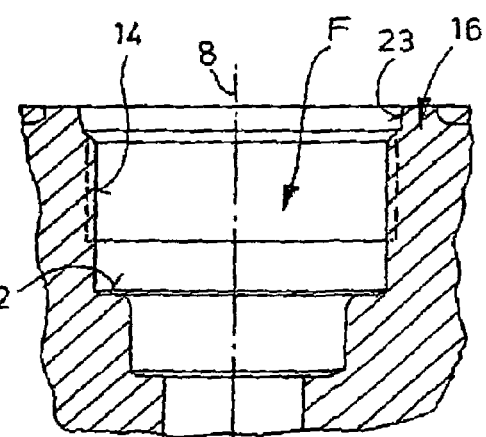

ADAPTER-INTERMEDIATE RING FOR A SCREW-IN PART OF A FLUID PLUG SYSTEM

CROSS REFERENCE TO RELATED APPLICATION

This application claims priority to DE 202 14 631.6, filed Sep. 20, 2002 and PCT/EP2003/009379, filed Aug. 25, 2003.

FIELD OF THE INVENTION

The present invention relates to a novel intermediate ring as an adapter for a screw-in part of a special fluid plug-in system. The screw-in part has a through-opening for plugging in a plug part, an externally threaded portion for screwing into a threaded bore of a base part, an actuating shoulder enlarged in a flange-like manner and in particular designed as an external hexagon, and a receiving groove, formed in the transition between the actuating shoulder and the externally threaded portion, with a sealing ring.

BACKGROUND AND SUMMARY OF THE INVENTION

Background for a plug-in system as referred to herein is described in EP 0 005 865 B1, for example, but also in a number of later publications, such as EP 0 913 618 A1. In this connection, the screw-in part, which can also be referred to as a cap screw, is inserted with its externally threaded portion into a threaded bore of a base part or housing part (for example of a pressure unit). The threaded bore is part of a special "shaped bore", on the one hand a radial step surface, which together with the screw-in part, or rather its end side, forms an annular chamber for receiving a holding ring element, being formed inside this shaped bore following the internal thread. The holding ring element serves for the positive locking of a plug part to be plugged into the through-opening of the screw-in part. The plug part is also removable by unscrewing the screw-in part together with the holding ring element. On the other hand, the shaped bore has on the mouth side a widening, which, together with the flange-like actuating shoulder (external hexagon) and the adjacent receiving groove of the screw-in part, forms a seal chamber for enclosed, compressed accommodation of a sealing ring. Moreover, the special shaped bore is designed in such a way with regard to its length, or rather depth, that on the one hand the screw-in part can be screwed in completely and tightened with the necessary torque and on the other hand the plug part can also be plugged completely into or through into its locked plugged-in position without colliding with the step surface in the shaped bore.

There are now applications in practice where such a plug-in system is to be inserted into other threaded bores, for example into a "standard bore" according to DIN 3852 (Part 1, Form Y). On the one hand, such standard bores have a surrounding surface directly adjacent on the mouth side without a seal widening (without chamber contour) and, on the other hand, they are as a general rule not designed deep enough. Use of the plug-in system described has therefore previously necessitated special adapters with, on one side a screw-in piece for the standard bore, and on the other side a lengthened portion with the shaped bore described above. On the connection side, toward the standard bore, such adapters have an axial receiving chamber for a (second) sealing ring in such a way that this sealing ring is enclosed when axial bearing contact is made with the surrounding surface of the standard bore. However, such adapters are expensive and lead to a disadvantageously large overall length of the arrangement as a whole.

The object of the present invention is to provide a simple and cost-effective possibility for equipping any "standard bores" as well with a plug-in system of the type described without in so doing bringing about an appreciable increase in overall length.

According to the invention, this is achieved by a novel adapter intermediate ring according to claim 1. Advantageous development features are contained in the subclaims. The intermediate ring according to the invention, which can be fitted directly coaxially onto the externally threaded portion of the screw-in part, consists of two axially opposite annular portions. The first annular portion having, on the side facing the actuating shoulder, a first seat, which, together with the receiving groove and the actuating shoulder, forms a first seal chamber for the first sealing ring located in the receiving groove. The second, directly adjacent annular portion has a second seat for a second sealing ring in such a way that, when the screw-in part is screwed into a threaded bore (standard bore) having a surrounding surface adjacent on the mouth side, a second seal chamber for the second sealing ring is formed between the second seat, the surrounding surface and the externally threaded portion. On the one hand, in the region of the first annular portion, the intermediate ring according to the invention has on the inside for all practical purposes the sealing ring chamber contour of the special shaped bore, as the sealing ring seat corresponds essentially to the widening of the shaped bore. On the other hand, the second annular portion is also designed for optimum enclosure of a second sealing ring, in fact, advantageously, in interaction with any standard bore as well, as the seat of the second annular portion corresponds for all practical purposes to the sealing ring chamber contour of the seal receiving chamber of known adapters.

According to the invention, the intermediate ring also acts as a distance ring at the same time, as it has an axial length, or rather thickness, dimensioned according to the threaded bore concerned in such a way that both on the one hand the screw-in part—if appropriate together with additional parts mounted thereon, such as in particular with a plug holding element (holding ring element)—can be screwed in completely to the requisite compression of the first sealing ring and on the other hand an associated plug part can also be plugged completely into or rather through the through-opening of the screw-in part into a correct plugged-in position. In this connection, however, the length/thickness of the intermediate ring should also be limited approximately to an adequate minimum value in such a way that the screw-in part is still located with sufficient stress-bearing thread turns, for example with at least three complete thread turns, inside the threaded bore.

Additional, very long adapters are rendered unnecessary by the intermediate ring according to the invention. Using the simply and rapidly fitted intermediate ring, the screw-in part of the plug-in system can advantageously be inserted directly into, for all practical purposes, any threaded bores. As a result, the overall length of the arrangement increases only slightly by merely the length, or rather thickness, of the intermediate ring. The intermediate ring according to the invention is moreover very much more cost-effective in comparison with known, large-volume adapters, because, with a much lower material requirement, it can also be manufactured more simply and more rapidly, in particular as a simple turned part made of brass, for example.

BRIEF DESCRIPTION OF THE DRAWINGS

The invention is to be explained in greater detail below by way of example with reference to the drawings, in which, in longitudinal section in each case.

FIG. 5 shows a conventional plug-in system in the mounted and plugged-in state corresponding to FIG. 1 but without the intermediate ring according to the invention;

FIG. 6 shows a view corresponding to FIG. 2 in the application without an intermediate ring as in FIG. 5;

FIG. 7 shows a base part with a "shaped bore" adapted specially to the plug-in system;

DETAILED DESCRIPTION OF THE INVENTION

Figure 1:
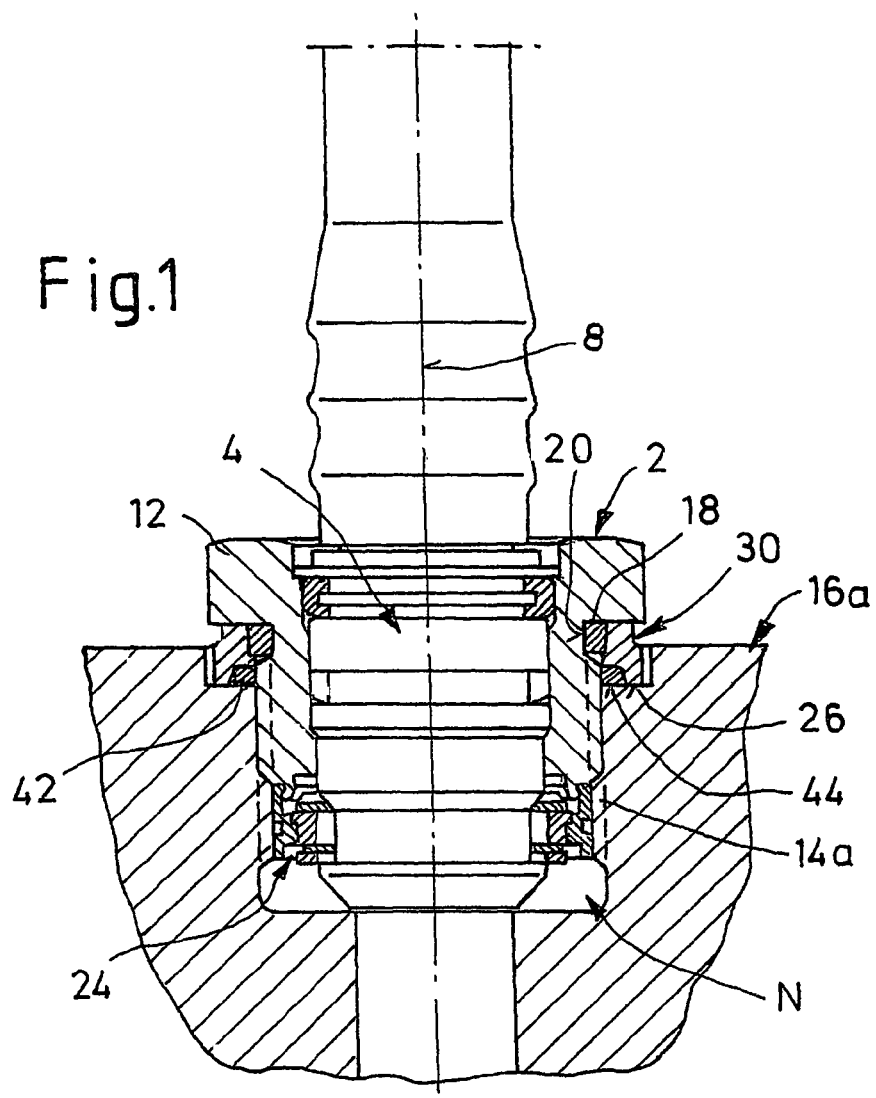
FIG. 1 shows a plug-in system equipped with an intermediate ring according to the invention in the mounted and plugged-in state of the screw-in part and the plug part.
Figure 2:
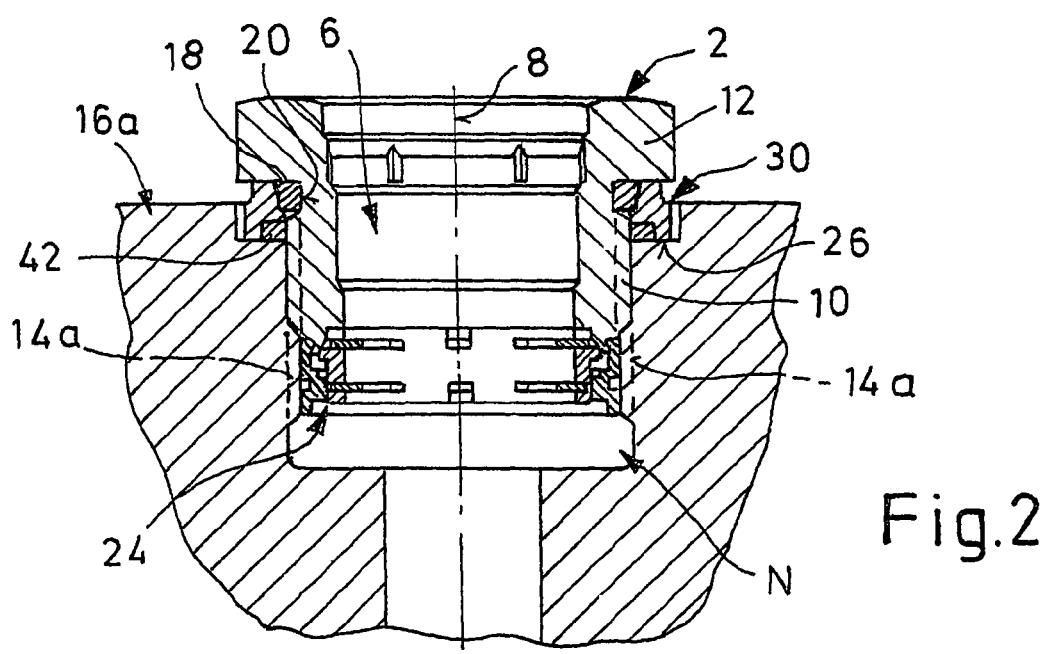
FIG. 2 shows the plug-in system according to FIG. 1 without the plug part.
Figure 3:
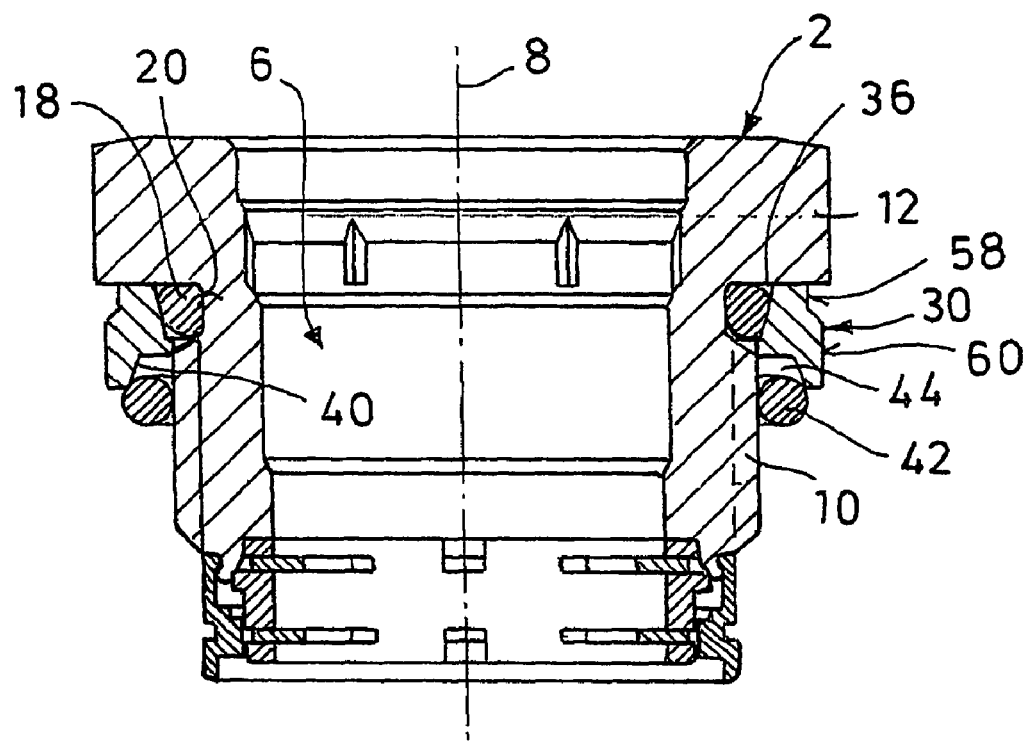
FIG. 3 shows a separate, enlarged illustration of the screw-in part with the intermediate ring according to the invention.

In the various figures of the drawings, identical parts are always provided with the same references.

First, the plug-in system referred to here is to be explained with reference to FIGS. 5 to 7. This system consists of a screw-in part 2 (cap screw) and a plug part 4 to be plugged in. The screw-in part 2 has a through-opening 6 for plugging in the plug part 4 in the direction of a plugging-in axis 8. The screw-in part 2 also has a sleeve-like externally threaded portion 10 with an actuating shoulder 12, which is located on one side, enlarged in a flange-like manner and in particular designed as an external hexagon. The screw-in part 2 can be screwed with the externally threaded portion 10 into a threaded bore 14 of a base part 16. For sealing between the screw-in part 2 and the base part 16, a sealing ring 18 is provided, which is located in a channel-like receiving groove 20 formed in the transition between the actuating shoulder 12 and the externally threaded portion 10. The base part 16 can be for all practical purposes any housing part, for example a pressure unit.

In the case of the embodiment according to FIGS. 5 to 7, the threaded bore 14 is part of a shaped bore (F), which has a radially inwardly projecting step surface 22 below the threaded bore 14 (see FIG. 7). An approximately conical widening 23 (sealing ring chamber contour), which, together with the actuating shoulder 12 and the adjacent receiving groove 20, forms a seal chamber for enclosed, compressed accommodation of the sealing ring 18, is formed in the mouth region of the shaped bore F, or rather of the threaded bore 14. In this connection, the shaped bore F is dimensioned in such a way that, in the screwed-in state of the screw-in part 2 according to FIGS. 5 and 6, an annular chamber for receiving a holding ring element 24 is formed axially between the screw-in part 2, or rather its end side, and the step surface 22. Moreover, the design of the shaped bore F is adapted to the plug-in system in such a way that, according to FIG. 5, the plugged-in plug part 4 secured in a positively engaging manner against removal via the holding ring element 24 is arranged in a collision-free manner inside the shaped bore F.

In the preferred embodiment, the holding ring element 24 is held on the screw-in part 2 via catch means. Details of this configuration of the holding ring element 24 are contained in EP 0 913 618 A1 already mentioned above and the corresponding DE 297 19 247 U; reference is therefore made to these publications in full at this point.

It is now desirable in many applications for it to be possible to insert the plug-in system described (screw-in part 2 with plug part 4) into threaded bores of different shape as well.

Figure 8:
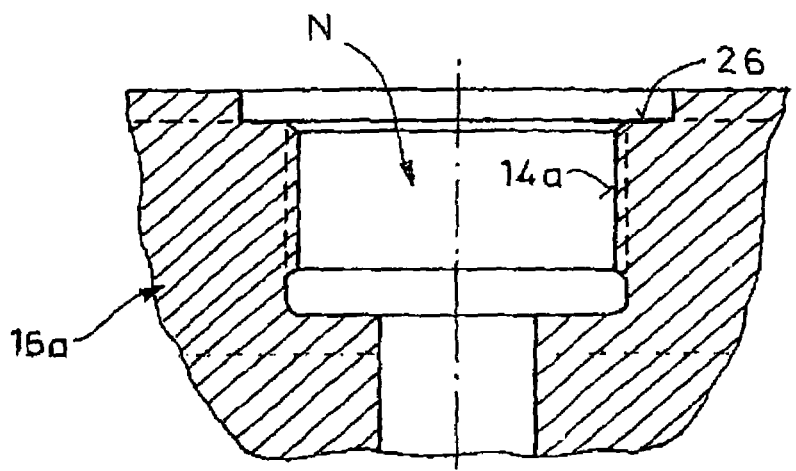
FIG. 8 shows a base part with a "standard bore"
Figure 9:
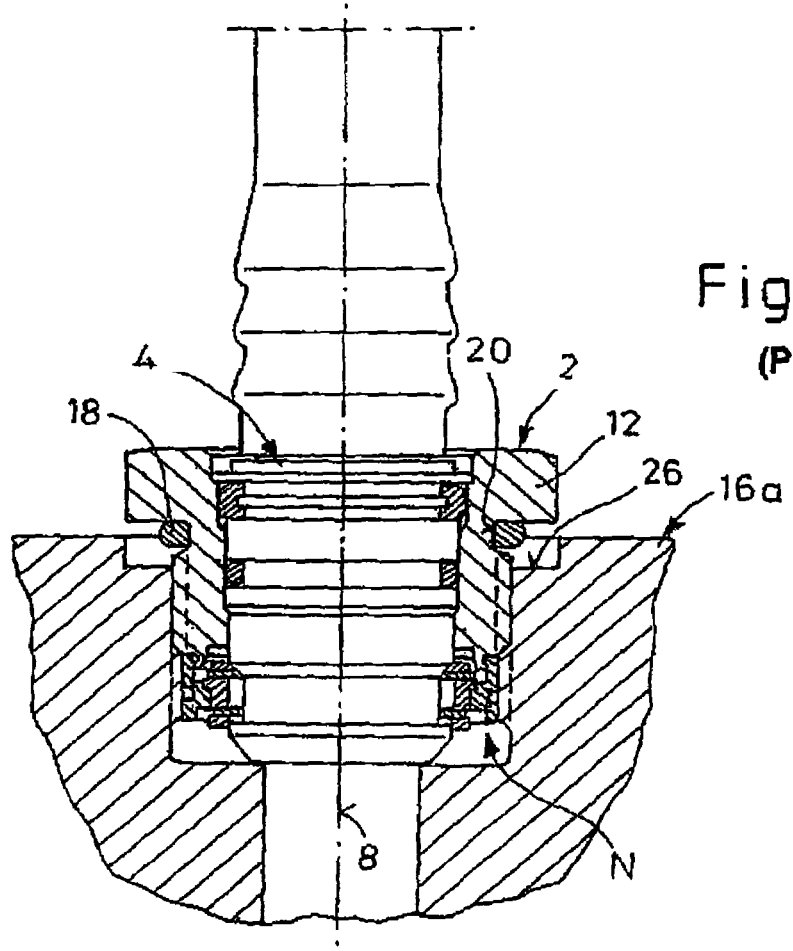
FIG. 9 shows the base part with a standard bore according to FIG. 8 with plug-in system inserted but without intermediate ring (not operational, only to illustrate the problem).

FIGS. 8 and 9 illustrate by way of example a base part 16a with a standard bore N. This may be a configuration according to DIN 3852 (Part 1, Form Y). In this connection, as illustrated in FIG. 9, on the one hand the screw-in part 2 could not be screwed completely into a sealed position, and on the other hand the plug part 4 cannot be plugged in a correct and collision-free manner. In contrast to the shaped bore F, the standard bore N has no chamber contour for the sealing ring 18 in the mouth-side region of the threaded bore 14a but rather a mouth-side surrounding surface 26, which merges directly in a sharp edge, or rather via a slight chamfer, with the threaded bore 14a (see FIG. 8). FIGS. 8 and 9 illustrate an embodiment where the surrounding surface 26 is formed as a depression, but this can also, according to FIG. 8, be a continuous plane surrounding surface 26 as indicated by broken lines.

In order for it now to be possible to use the plug-in system with screw-in part 2 and plug part 4 in such standard bores N as well, a novel adapter intermediate ring 30 is proposed according to the invention in accordance with FIGS. 1 to 4. This intermediate ring 30 according to the invention can be fitted coaxially onto the externally threaded portion 10 of the screw-in part 2 and has two axially opposite annular portions 32 and 34 (see in particular FIG. 4). On the side facing the actuating shoulder 12, the first annular portion 32, together with the receiving groove 20 and the actuating shoulder 12, forms a first seal chamber 36 for the sealing ring 18, for which purpose it has as a chamber contour a widening seat 38, which corresponds essentially to the widening 23 of the shaped bore F (cf. FIG. 7). The opposite, second annular portion 34 has a second seat 40 for a second sealing ring 42 in such a way that, when the screw-in part 2 is screwed into the standard bore N—see FIGS. 1 and 2—a second seal chamber 44 for the second sealing ring 42 is formed between the second seat 40, the bore surrounding surface 26 and the externally threaded portion 10. In this connection, the two sealing ring seats 38 and 40 and the associated sealing rings 18 and 42 are designed in such a way that, in the mounted state according to FIGS. 1 and 2, optimum compression of both sealing rings 18, 42 is achieved, and the second sealing ring 42 is compressed mainly axially essentially without radial deformation acting against the externally threaded portion 10. By virtue of this advantageous development, damage of the second sealing ring 42 by bearing contact against the externally threaded portion 10 is avoided, so that as many repeat mounting operations as desired are possible.

Figure 4:
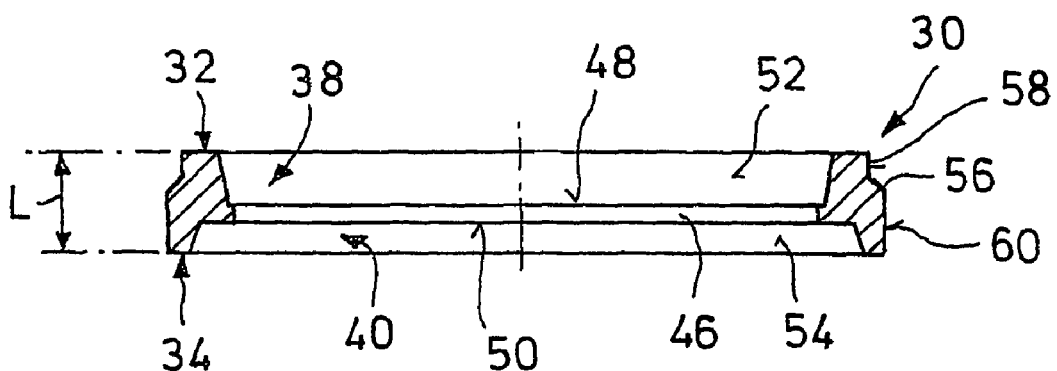
FIG. 4 shows only the intermediate ring according to the invention according to FIG. 3.

As can be seen most clearly in FIG. 4, the two annular portions 32, 34 of the intermediate ring 30 are separated by an internal radial annular web 46 which divides the two sealing ring seats 38, 40 from one another. By virtue of this, each sealing ring seat 38, 40 is formed by a radial step surface 48 or 50 and an approximately conically widening delimiting surface 52 and 54 respectively adjacent to it on the outside.

As the first sealing ring 18 is located in the receiving groove 20, it has a smaller diameter in the mounted state than the second sealing ring 42 arranged on the externally threaded portion 10. The first annular portion 32 of the intermediate ring 30 is therefore also designed to be smaller in diameter, at least on the inside and preferably outwardly as well, than the second annular portion 34. By virtue of this, a radial or inclined (conical) step 56 can be formed on the outside. However, the two sealing rings 18, 42 preferably have the same dimensions before mounting. As the second seal chamber 44, or rather the second seat 40, has a larger diameter than the first seal chamber 36, or rather the first seat 38, the second sealing ring 42 is stretched during mounting in such a way that its ring cross section is reduced in a defined way. The step 56 preferably formed on the outside of the circumference of the intermediate ring 30 advantageously allows the user easily to recognize positional accuracy when the intermediate ring 30 is fitted, in which connection a portion 58 of smaller outside diameter is to be directed toward the actuating shoulder 12 and a larger portion 60 must face away from the actuating shoulder 12 (cf. FIG. 3).

The intermediate ring 30 according to the invention is furthermore dimensioned with regard to its axial length, or rather thickness, L according to the standard bore N concerned in such a way that both on the one hand the screw-in part 2, together with the holding ring element 24 preferably mounted thereon, can be screwed in completely to the requisite compression of the first sealing ring 18 and on the other hand the associated plug part 4 can be plugged completely into or rather with the free end through the through-opening 6 of the screw-in part 2 into its correct plugged-in position. In this connection, however, the length L should also be limited approximately to an adequate minimum value in such a way that the screw-in part 2 is with its externally threaded portion 10 still located with sufficient stress-bearing thread turns (if made of brass roughly three for example) inside the threaded bore 14a.

The invention is not limited to the illustrative embodiments represented and described but also comprises all embodiments acting in the same way according to the spirit of the invention. By virtue of the holding ring element 24 being mounted on the screw-in part 2, it is also possible, for example, to insert the plug-in system (2, 4) into a threaded through-bore of a housing wall for example (with or without intermediate ring 30 depending on mouth-side embodiment of the threaded bore), the holding ring element 24 projecting freely into an inner space because it is possible to dispense with axial support via a step surface, for example, during plugging-in of the plug part 4. Furthermore, the intermediate ring 30 according to the invention can advantageously also be used in the screwing of connection pieces according to ISO 4039-2 and/or connection pieces according to ISO 6149-3 into bores according to DIN 3852-1 and 2.

While the above description constitutes the preferred embodiment of the present invention, it will be appreciated that the invention is susceptible to modification, variation and change without departing from the proper scope and fair meaning of the accompanying claims.

The invention claimed is:

1. An adapter assembly including an axially rigid intermediate ring and a screw-in part of a fluid plug-in system, the adapter assembly comprising the screw-in part having a through-opening for plugging in a plug part, an externally threaded portion having an outer thread diameter configured for screwing into a threaded bore of a base part having a surrounding surface adjacent to a mouth of the threaded bore, an actuating shoulder having an outer shoulder diameter being larger than the thread diameter, a receiving groove formed in the transition between the actuating shoulder and the externally threaded portion, and a first sealing ring being disposed in the receiving groove; the intermediate ring adapted to fit onto the externally threaded portion and having first and second axially opposite planar annular portions, the first planar annular portion configured to engage the actuating shoulder, and the intermediate ring having a first sealing ring seat on a first side facing the actuating shoulder, the first sealing ring seat and the receiving groove and the actuating shoulder forming a first sealing chamber for the first sealing ring, and the second planar annular portion being located at the terminal end of a lower ring step extending away from the actuating shoulder and having a second sealing ring seat on a side facing away from the actuating shoulder for a second sealing ring, said second sealing ring surrounding and overlapping at least one thread of the externally threaded portion of the screw-in part and said second sealing ring further having an axial length, in an optimally compressed state, substantially equal to the axial length of the lower ring step, such that, when the screw-in part is screwed into the threaded bore of the base part, the second sealing ring seat, the surrounding surface adjacent to the threaded bore, and the externally threaded portion of the screw-in part cooperate to form a second sealing chamber for the second sealing ring.

2. The intermediate ring as claimed in claim 1, wherein the first and second sealing ring seats and the associated first and second sealing rings are formed such that, in a mounted state, the first and second sealing rings are compressed, wherein the second sealing ring is compressed axially without substantial radial deformation against the externally threaded portion.

3. The intermediate ring as claimed in claim 1 further comprising that the first and second planar annular portions are separated by an internal radial annular web which divides the first and second seats from one another.

4. The intermediate ring as claimed in claim 1 further comprising each sealing ring seat is formed by a radial step surface and an approximately conically widening delimiting surface adjacent to it on the outside.

5. The intermediate ring as claimed in claim 1 wherein a thickness of the intermediate ring is dimensioned according to the threaded bore such that both the screw-in part and a plug holding element mounted on the screw-in part can be screwed into the bore to compress the first sealing ring and provide a gap between an end of the plug part and a bottom of the bore when the plug part is plugged into the screw-in part and engaged with the plug holding element.

6. The intermediate ring as claimed in claim 1 comprising that the first planar annular portion is designed to be smaller in diameter than the second planar annular portion.

7. The intermediate ring as claimed in claim 1 comprising the intermediate ring formed of a turned part made of metal.

8. An adapter assembly for a fluid plug-in system, comprising:
a screw-in part comprising a through-opening for plugging in a plug part, an externally threaded portion having an outer thread diameter configured for screwing into a threaded bore of a base part having a surrounding planar surface adjacent to a mouth of the threaded bore, an actuating shoulder having an outer shoulder diameter larger than the externally threaded portion diameter, and a receiving groove formed in the transition between the actuating shoulder and the externally threaded portion;

an axially rigid intermediate ring sized to fit onto the externally threaded portion of the screw-in part, an upper planar annular portion configured to engage the actuating shoulder, an upper sealing ring seat on an upper side of the intermediate ring facing the actuating shoulder, an axially opposite lower ring step extending away from the actuating shoulder, said lower ring step terminating at a lower planar annular portion configured to engage the planar surface surrounding the area adjacent to the mouth of the threaded bore, and a lower sealing ring seat on a lower side of the intermediate ring between the lower planar annular portion and the ring threads;

an upper sealing ring disposed in an upper sealing ring chamber; and a lower sealing ring disposed in a lower sealing ring chamber, wherein the lower sealing ring surrounds and overlaps and contacts at least one thread of the externally threaded portion of the screw-in part, and further wherein the axial length of the lower sealing ring in an optimally compressed state is substantially equal to the axial length of the lower ring step;

wherein the intermediate ring cooperates with the screw-in part to form the upper sealing ring chamber defined by the upper sealing ring seat, the actuating shoulder, and the receiving groove, and further wherein the intermediate ring cooperates with the base part to form the lower sealing chamber defined by the lower sealing ring seat, the externally threaded portion of the screw-in part, and the planar surface adjacent to the mouth of the threaded bore.

9. The intermediate ring as claimed in claim 8, wherein the upper and lower sealing ring seats and the associated upper and lower sealing rings are formed such that, in a mounted state, the upper and lower sealing rings are compressed, and further wherein the lower sealing ring is compressed axially without substantial radial deformation against the externally threaded portion.

10. The intermediate ring as claimed in claim 8 further comprising the upper and lower planar annular portions being separated by an internal radial annular web which divides the upper and lower seats from one another.

11. The intermediate ring as claimed in claim 8 further comprising each sealing ring seat being formed by a radial step surface and an approximately conically widening delimiting surface adjacent to it on the outside.

12. The intermediate ring as claimed in claim 8 wherein a thickness of the intermediate ring is dimensioned according to the threaded bore such that both the screw-in part and a plug holding element mounted on the screw-in part can be screwed into the bore to compress the upper sealing ring and provide a gap between an end of the plug part and a bottom of the bore when the plug part is plugged into the screw-in part and engaged with the plug holding element.

13. The intermediate ring as claimed in claim 8 further comprising the upper planar annular portion being smaller in diameter than the lower planar annular portion.

14. The intermediate ring as claimed in claim 8 further comprising the intermediate ring formed of a turned part made of metal.

* * * * *

UNITED STATES PATENT AND TRADEMARK OFFICE
CERTIFICATE OF CORRECTION

PATENT NO. : 7,354,075 B2
APPLICATION NO. : 10/528207
DATED : April 8, 2008
INVENTOR(S) : Harald Hagen Page 1 of 1

It is certified that error appears in the above-identified patent and that said Letters Patent is hereby corrected as shown below:

In claim 1, column 6, line 20, replace "said second sealing ring surrounding and overlapping at least one thread of he externally threaded portion of the screw-in part" with --said second sealing ring surrounding and overlapping and in contact with at least one thread of the externally threaded portion of the screw-in part--

In claim 8, column 7, line 20, replace "lower" with --second--

Signed and Sealed this

Thirtieth Day of September, 2008

JON W. DUDAS
*Director of the United States Patent and Trademark Office*